United States Patent [19]

Raymond

[11] 4,055,197

[45] Oct. 25, 1977

[54] ELECTRO-PROPORTIONAL PRESSURE CONTROL APPARATUS

[75] Inventor: Robert E. Raymond, Zanesville, Ohio

[73] Assignee: De Laval Turbine Inc., Princeton, N.J.

[21] Appl. No.: 721,936

[22] Filed: Sept. 10, 1976

[51] Int. Cl.² .................. G05B 6/05; G05D 16/00
[52] U.S. Cl. ........................... 137/84; 137/85
[58] Field of Search ............ 137/84, 85, 115, 116, 137/489

[56] References Cited

U.S. PATENT DOCUMENTS

| | | | |
|---|---|---|---|
| 2,638,911 | 5/1953 | Griswold | 137/84 |
| 3,683,949 | 8/1972 | Perkins | 137/84 |
| 3,702,621 | 11/1972 | Mohri | 137/85 |

*Primary Examiner*—Alan Cohan

*Attorney, Agent, or Firm*—Hopgood, Calimafde, Kalil, Blaustein & Lieberman

[57] ABSTRACT

The invention contemplates improved hydraulic-pressure control apparatus which will proportionally reflect input-signal changes governing a wide range of output pressures. Use of a separate preamplifier stage, between a signal-pressure stage and a power stage, enables the signal pressure to remain essentially unaffected by load reaction or other transients at the power stage. In the forms described, an input electrical signal determines a step-function program of signal-pressure levels, and the power stage includes a relief valve which so diverts system-line flow to a sump as to assure quick and accurate response of system-line pressure to the instantaneous input electrical-signal level, all without system-pressure overshoot.

23 Claims, 11 Drawing Figures

Fig. 1.

SIGNAL STAGE | PREAMP SENSOR STAGE | POWER STAGE

ELECTRO-PROPORTIONAL PRESSURE CONTROL APPARATUS

This invention relates to hydraulic control apparatus and in particular to pressure-control means for such apparatus. Although the invention will be described in the context of a hydraulic relief valve and electric-signal operated means for controlling the relief-valve function, it is to be understood that certain aspects of the invention are of greater application than the indicated context.

So far as I am aware, the so-called electro-proportional relief valves or valve systems which are currently available are based on the combination of a pilot-operated relief valve, with a torque motor applied directly to the pilot poppet. Overall performance is considered inadequate by industrial customers, for a number of basic reasons, some related to limitations of the electro-hydraulic transducer (electro pilot), but mostly related to limitations of the hydraulic system. Among these inadequacies, which I consider to be inherent in the present systems, may be listed: (i) undue sensitivity of the electro-pilot stage to contaminants in the hydraulic fluid, (ii) unsatisfactory overall accuracy, stability and repeatability of main-valve pressure control, (iii) poor valve-receovery response, (iv) low-pressure control limitations, (v) a tendency to develop pressure-overshoot, (vi) high-pressure limitations, and (vii) decompression-shock characteristics.

Valve elements in the main stage of today's electro-proportional relief valves are of either the balanced-spool or the poppet variety, the latter being most prevalent because of the history of its acceptance in the industrial market. However, the poppet type is most prone to instability because the structural relationships dictate an inherently delicate opposition between jet forces and seating forces. The balanced spool-type valve is inherently more stable because seat-force balance is not a factor, and jet-force reaction can be stabilizing in the presence of increasing spring-rate bias. On the other hand, for sudden (step-function) load changes, pressure overshoot with a spool valve is considerably greater than for the poppet valve, due to spool lap in the closed position.

It is accordingly an object of the invention to provide an improved hydraulic-pressure control system avoiding or materially reducing the deficiencies of present systems.

A specific object is to provide a high-performance electroproportional relief-valve system.

Another specific object is to provide a system of the character indicated wherein a spool-type main valve is reliably operated without pressure-overshoot consequences.

It is also an object to provide an improved high-capacity spool-valve construction and improved means for its operation in a system of the character indicated.

Another object is to provide improved pilot-circuit techniques for hydraulic systems of the character indicated.

A further object is to provide such a hydraulic-control system, characterized by improved reliability, stability, repeatability, linearity, high regulation accuracy, low decompression shock, and a wide pressure range, with low sensitivity to contaminants in the hydraulic fluid.

A general object is to achieve the foregoing objects with inherently low-cost construction, featuring minimum maintenance and good serviceability.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Figure 1:
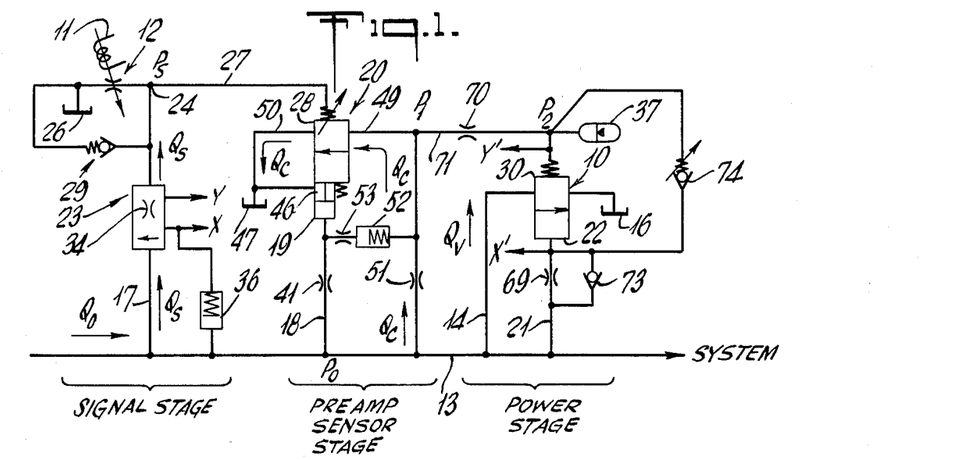
FIG. 1 is a hydraulic circuit diagram schematically indicating the nature and interconnection of a three-stage embodiment of the invention.

For present illustrative purposes, the foregoing objects are achieved in the three-stage control system of FIG. 1, being a high-performance electro-proportional relief-valve system, wherein a power-stage main valve 10 is governed by an electric-signal input to the winding 11 of a signal-stage pilot valve 12. Bracketed legends in FIG. 1 generally identify component groupings of the three stages: the signal stage, the preamplifier sensor stage, and the power stage.

A system line 13 is supplied by a constant-flow source (not shown) at the supply rate $Q_o$, and system pressure $P_o$ in line 13 tracks signal input at 11 with substantial amplification and fidelity, by reason of the diverted flow $Q_v$, occasioned by operation of the main valve 10. Valve 10 is shown with an inlet connection 14 to the system line 13 and with an outlet connection 15 to sump, symbolized at 16.

The controlled pressure $P_o$ may be used as the basic feedback reference for operation of both the signal stage and the preamplifier stage. For this purpose, a line connection 17 to system line 13 provides pressure for a constant flow $Q_s$ serving the signal stage, and a connection 18 to a first pressure-responsive end 19 of a pilot valve 20 serves the preamplifier stage. Finally, at the power stage, a connection 21 to the system line 13 provides the same controlled-pressure ($P_o$) reference for a first-pressure-responsive end 22 of the main valve 10.

More particularly, the signal stage includes a pressure-compensated flow regulator 23 in line 17 to provide the constant flow $Q_s$ at 24 to the inlet port of the signal-stage pilot valve 12, and valve 12 has an outlet connection 25 to sump, symbolized at 26. The signal pilot-valve 12 is preferably an electro-magnetic torque-motor flapper which may be of the variety disclosed in my copending application, Ser. No. 649,657, filed Jan. 16, 1976. Since valve 12 is supplied with a constant pilot flow $Q_s$, the instantaneous pressure $P_s$ is always a function of signal current in winding 11, i.e., within the characteristics of the torque-motor valve 12, and this instantaneous signal pressure $P_s$ at 24 is continuously supplied via a connection 27 to a second pressure-responsive end 28 of the preamplifier pilot valve 20. A poppet valve 29 is connected across valve 12 to sump 26, and valve 29 is manually set for a selected maximum signal pressure $P_s$ at 24, thus determining an upper limit for controlled system pressure $P_o$.

For further identification of signal-stage components, it is noted (in the additional context of FIG. 2) that the pressure-compensated flow regulator 23 includes a valve member, such as a spool member 23' with body connections labeled X-Y. The spool-controlled body connections X-Y are respectively connected to connections X'-Y' at the two pressure-responsive ends 22-30 of the main valve 10, as suggested by arrow heads and as will later be more fully explained. It suffices at this point to indicate that by virtue of the relation between spool member 23' and the X-Y body connections at 23, a hydraulic "switch" is established at 23, providing an open line via X'-X-Y-Y' to equalize pressures at the main-valve ends 22-30, for a range of flow-regulating positions of the spool of valve 23; preferably, this range of positions applies only for the lower-pressure end of the controllable range of system pressure $P_o$, as will later become more clear.

Figures 2, 3, 4:
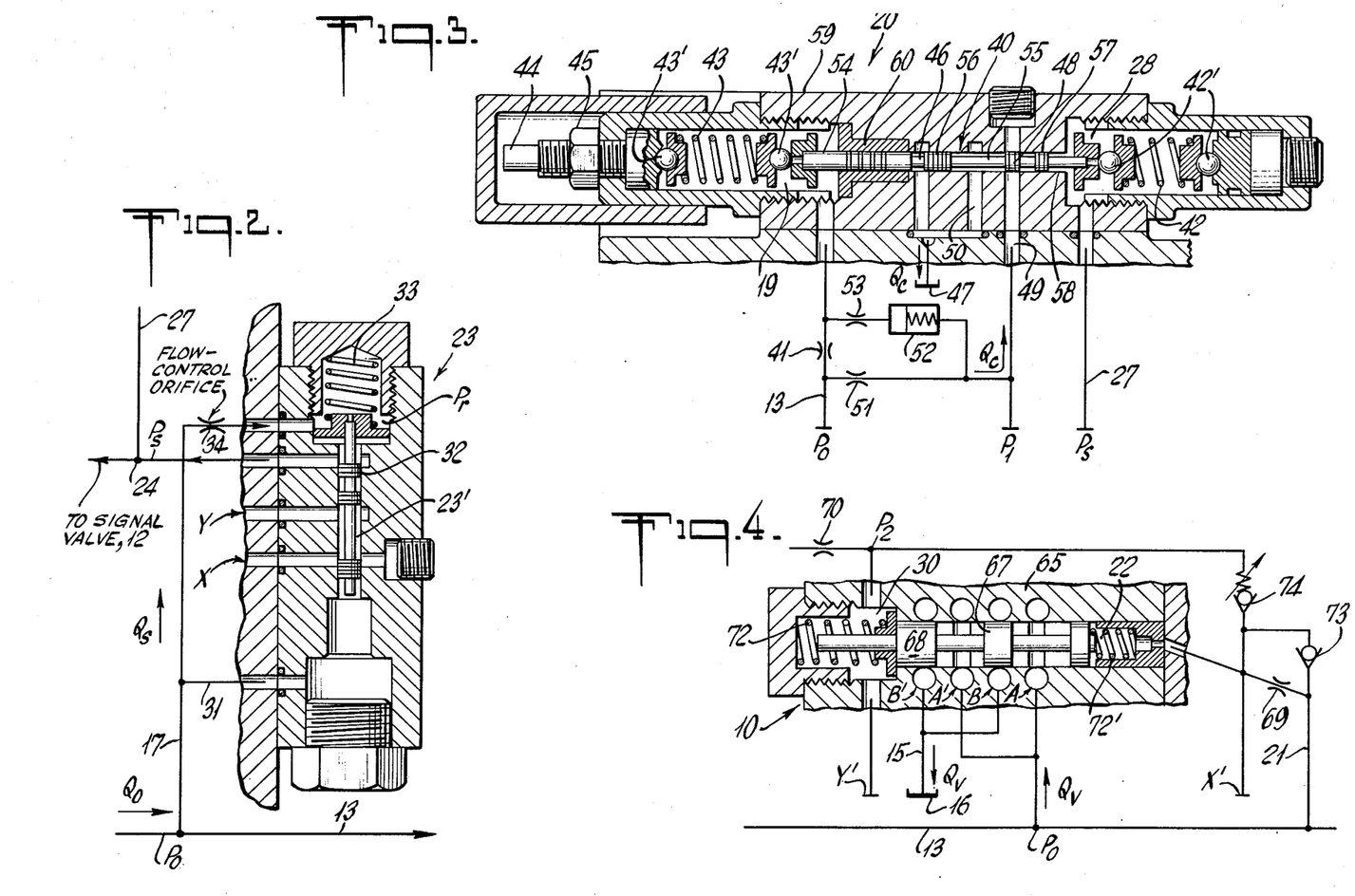
FIG. 2 is an enlarged view, partly in longitudinal section and partly schematic, showing a pressure-compensated flow regulator and switch, being a component of the signal stage of FIG. 1.
FIG. 3 is a view similar to FIG. 2, to show a pilot valve, being a component of the preamplifier stage of FIG. 1.
FIG. 4 is a view similar to FIG. 2, to show a main valve, being a component of the power stage of FIG. 1.

For metering of constant flow from the system line 13 to the signal-valve connection 24, valve 23 is seen to include a first connection 31 from line 17 for application of system pressure $P_o$ to the lower end of spool member 23', thus creating a force tending to elevate a valve-throttling land 32 carried by the upper end of spool member 23'. This force is opposed by a preloading spring 33 and by the reduced pressure $P_r$ available from a flow-control orifice 34 in a second connection 35 from line 17. Thus, whatever the system-line pressure $P_o$, and within the limits of operation of valve 23, a constant pressure drop across valve member 32 assures constant flow via orifice 34 and valve land 32 to the signal-valve connection 24.

Finally, the signal-stage components of FIG. 1 are shown to include a spring-loaded capacitance 36 (which may be a spring-loaded piston in a cylinder) as a shunt capacitance between system line 13 and the X connection to the body of valve 23, for purposes of tailoring pressure-derivative action on the power stage, due to the volume-effect of resilience (compressibility) of the hydraulic fluid, symbolized at 37, as will also later become more clear.

Turning now to the preamplifier stage 20 (FIGS. 1 and 3), a spool member 40 is seen to have a larger-area end 28 connected for response via line 27 to signal pressure $P_s$ and a smaller-area end 19 connected via an orifice 41 for response to system pressure $P_o$; in this context of pressure difference ($P_o$-$P_s$), null-balance springs 42-43 at the respective ends 19-28 determine a desired calibration position of member 40, e.g., minimum set-pressure level at valve 10 vs. minimum signal-pressure level $P_s$, as manually adjusted and locked at suitable means 44-45. A reduced intermediate region 46 of member 40, between the larger and smaller regions thereof, is vented to sump, suggested at 47. The spool 40 includes a land 48 which governs hydraulic flow at a rate $Q_c$, from an inlet passage 49 to an outlet passage 50, the latter being connected to sump (47); this flow $Q_c$ derives from the system line 13 via an orifice 51 and accounts for amplified pressure $P_1$ for application to the control end 30 of the power-stage valve 10. The amplification represents high gain over and accurate tracking of the signal pressure $P_s$ applied at 27-28. Finally, a spring-loaded capacitance 52 and an orifice 53 provide a feedback coupling from the amplifier output to the system-pressure sensing end 19 of spool member 40.

It is important to the quick-response high-gain performance of the described preamplifier stage that friction in the force chain be kept to acceptably low levels. To this end, the valve member 40 preferably comprises a sensor-piston part 54 independent of a spool-valve part 55, and each of these parts is guided in its own precision-aligned continuous bearing bore. Thus, the spool-valve part 55, which includes the control land 48, is (with its outer lands 56-57) guided solely by the precision bore 58 in the valve body 59; and the sensor-piston part 54 is guided solely by the precision bore of a bushing 60 fitted to a counterbore in body 59. Further, the springs 42-43 which constantly urge the parts 54-55 in end-to-end abutment are shown with ball-pivot suspensions 42'-43' at both ends of both springs.

FIG. 4 illustrates my preference for use of a spool-valve construction at the power-stage valve 10, and it further illustrates my preference for use of a "stacked-port" configuration of such a valve. Valve 10 is a full-flow balanced spool valve with sufficient maximum port area to handle rated system flow at specified open-port pressure drop. Specifically, the valve body 65 is provided with a configuration of plural inlet-flow ports A-A' in interlaced array with a corresponding plurality of outlet-flow ports B-B'; the inlet ports A-A' are served by separate branches of the connection 14 to the system line 13, and the outlet ports B-B' are served by separate branches of the connection 15 to sump 16. The valve spool is shown with spaced lands 66-67-68, the latter two of which so lap the described ports that, in displacing leftward from the closed position shown in FIG. 4, the port systems A-B and A'-B' are opened in parallel, to provide the relieving flow $Q_v$ by which system pressure $P_o$ is determined. As previously indicated, a chamber 22 at one end of valve 10 reflects instantaneous system pressure $P_o$ via connection 21 and a damping orifice 69, and the control pressure $P_2$ (available via a damping orifice 70 in the connection 71 to the preamplifier output) is applied to a chamber 30 at the other end of valve 10; except during transient conditions involving sudden or large changes in system pressure, the pressure $P_2$ at the chamber 30 is as a practical matter identically the same pressure $P_1$ as delivered by the preamplifier outout, so that the main-valve positioning pressure is effectively $P_o$-$P_1$. The net force of a preload spring 72 (at the control-pressure end of valve 10) and a feedback spring 72' (at the other end of valve 10) preloads the main-valve spool in the valve-closing direction; thus, in a normal equilibrium condition for a given relieving flow $Q_v$, the extent of valve opening at A-B and A'-B' is the combined result of net spring bias and of net opposed pressures, $P_2$ at chamber 30 and $P_0$ at chamber 22.

Finally, to permit rapid opening of the main-valve spool during sudden pressure-rise conditions, a check valve 73 is shown in shunt across the orifice 69, and controlled decompression is obtained by limiting power-stage flow with a resistance check valve 74 shown in shunt across the entire valve spool, i.e., between the system-pressure chamber 22 and the control-pressure chamber 30.

The cooperation of described hydraulic-circuit elements will be better understood from a description of an illustrative case wherein maximum system pressure $P_o$ is 3000 psi and wherein the power stage has the following nominal size parameters:

$Q_r$ — Maximum rates flow — 40 gallons/minute (gpm).
$D_s$ — Valve (10) spool diameter — 0.625 inch.
$X_m$ — Maximum spool displacement — 0.250 inch.
$K_a$ — Flow-area gradient* — 3.92 in²/in.
$A_v$ — Effective open-port area — 0.396 in².
$C_v$ — Open port flow coefficient — 10.3 gpm/$\sqrt{}$psi.
$A_x$ — Axial control area — 0.306 in².
$F_b$ — Initial spring bias (net) — 10.7 lbs. (equivalent to 35 psi).
$K_s$ — Net bias spring rate — 60 lbs/in.

* By optionally providing a 1/32-in. lap of land 68 at port B' and a 1/16-in. lap of land 67 at port B, a $K_a$ of 1.96 in²/in. is obtained for low-flow and high-pressure operation, increasing to a $K_a$ of 3.92 in²/in. for higher-flow and lower-pressure operation.

Figure 5:
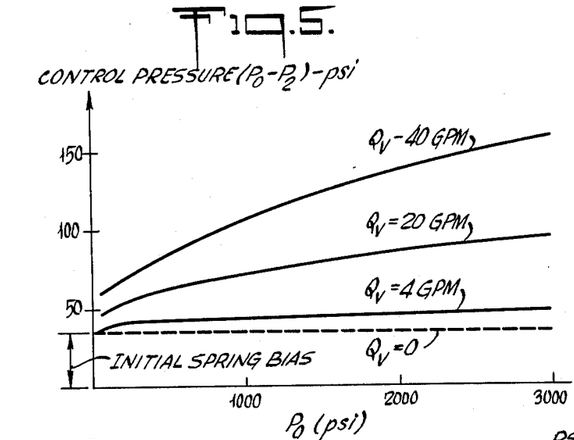
FIGS. 5 and 6 are graphs to illustrate performance features of components of FIG. 1.

For the indicated size parameters, FIG. 5 is a graphical presentation of power-stage control-pressure characteristics, wherein the initial spring bias $F_b$ is identified and $\Delta P_x$ represents differential pressure required over the area $A_x$ to support control-force loads on the spool during operation at various system pressures and valve flows. This differential pressure $\Delta P_x$ will be recognized as the effective output of the preamplifier stage, namely, $P_o$ minus $P_1$ (or $P_2$). The profiles of FIG. 5 indicate that at maximum rated flow $Q_v$ adequate control pressure is available from the system ($P_o$) down to system pressures of approximately 65 psi; however, for conservative purposes I regard 120 psi as a practical minimum set pressure, to insure a satisfactory $P_o$ supply to the signal stage and thus to assure reasonable response. For situations in which system pressures are at lesser levels, the modification of FIG. 7 has certain attractive features and will be later discussed.

For small signals, i.e., small signal changes, the frequency response of the power stage (i.e., spool displacement as a function of $\Delta P_x$) is very high (e.g., 1300 Hz at 1000 psi), unless damped. This high-frequency response (in absence of damping) can be attributed to low mass of the spool, coupled with a substantial dynamic spring rate, the latter being the net sum of bias-spring, jet-force reaction and substantial oil-resilience effects in the pilot-served chamber 30; it will be recalled that such oil-resilience effects are a function of volume in chamber 30 and in the preamplifier connection 71, being symbolized at 37 in FIG. 1. To eliminate instability, high reset damping is accomplished by orifice 69 serving the $P_o$ chamber 22, since check valve 73 promptly closes for any spool shift in the closing direction. Yet even with such damping, the net result is a power-stage small-signal frequency response which is relatively high (in excess of 100 Hz) without instability and without introducing significant overall control phase shift.

In cases where the power-stage spool must be suddenly displaced a more considerable distance, other control factors are introduced. During sudden pressure-rise conditions, for example when a given system-operated function is completed and thus stops flow to the system, the flow switch associated with the flow regulator 23 (FIG. 2) closes to disconnect the line X'-X-Y-Y' between chambers 22-30, the differential pressure transiently displacing the main valve spool to compress the oil volume symbolized at 37 (effectively a capacitance), thereby opening the power stage to relieve system pressure. In addition, during shock conditions, the preamplifier stage permits development of a substantial pressure drop across orifice 70, thereby increasing the speed with which the main-valve spool can be displaced in the opening direction. Conversely, if the main-valve spool is in an open position and must close to develop pressure rapidly, the flow switch at 23 opens to allow short circuit loop flow within the main-valve spool area, thus allowing the net-spring bias to close the spool. It has been found effective to so devise the X-Y switch associated with valve 23 that the switch function is open for $P_o$ below approximately two-thirds of set pressure and is closed for $P_o$ above this level.

Returning to the pilot or preamplifier stage 20 for illustrative detail for use at the above-described scale of the power stage valve 10, it will be recalled that the effective sectional area of the system-pressure ($P_o$) sensing piston part 54 is preferably of less than that of the signal-pressure ($P_s$) sensing part 55. The stage 20 thus provides, via the indicated differential-area construction, for response to signal pressure in the context of direct reference to the system pressure to be controlled. Illustratively, a preamplifier spool (55) of 0.187-in. diameter and a sensor piston (54) of 0.156-in. diameter provide a signal-to-system pressure ratio of 1.44:1, meaning that for signal-pressure operations at 3000 psi, a signal pressure at 2083 psi is involved. Lower signal-pressure levels will be appreciated as favorable to performance of the electrically responsive signal-pressure valve 12, it being noted that commercial torque-motor flapper valves (as at 12) are sensitive to contamination, particularly at low flow, so that their operation at a maximum of 2000 psi is preferred. Moreover, the indicated signal-to-system pressure ratio can be increased by further change in the differential-area relationship, should extended valve operation be desired, as to a $P_o$ of 5000 psi.

Using the indicated differential-pressure response, valve member 48 operates on the flow $Q_c$ to produce an output gain which may be expressed in terms of small-signal "D-C" gain reactions:

$$\frac{\Delta P_o - \Delta P_1}{\Delta P_o} = 1 - \frac{\Delta P_1}{\Delta P_o}$$

where:

$$\frac{\Delta P_1}{\Delta P_o} = - \frac{100 K_a \sqrt{P_1}\left(\frac{A_x}{K_s}\right) - g_c}{g_c + g_p}$$

so that gain $$\frac{(\Delta P_o - \Delta P_1)}{\Delta P_o} = \frac{100 K_a \sqrt{P_1}\left(\frac{A_x}{K_s}\right) + g_p}{g_c + g_p}$$

wherein:

$\Delta P_o - \Delta P_1$ — Incremental output pressure
$\Delta P_o$ — Incremental error pressure
$P_1$ — Secondary pilot pressure
$K_a$ — Amplifier spool (48) flow area gradient
$A_x$ — Sensor piston (54) area
$K_s$ — Null-bias spring rate (42-43), plus jet-force rate
$g_p$ — Amplifier spool (48) incremental conductance
$g_c$ — Control orifice (51) incremental conductance Also, in connection with pre-amplification, capacitance at 42 will be understood to provide stabilizing gain reduction (as a function of increasing frequency) to insure valve stability.

Figure 6:
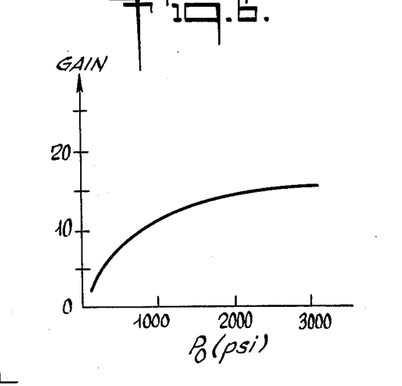

FIG. 6 displays a theoretical gain profile of the preamplifier stage at 20, as a function of operational system pressure $P_o$. Gain increases with operating pressure, and this circumstance will be seen as desirable since the power-stage control-load demand also increases substantially with operating power (see FIG. 5). A regulation accuracy of $P_o$ within 15 psi has been realized over the stated power-stage operating range of 4 to 40 gpm and 150–3000 psi, for zero signal-pressure variation at the set point. To achieve this result, care was taken to reduce friction to a low level, as noted above, and by taking advantage of the dither-pressure amplitudes inherent in most hydraulic-pump systems at frequencies above 100 Hz; such a hydraulic pump may be the source for the flow $Q_o$ and is symbolized by the arrow at $Q_o$ in FIG. 1.

At the signal-pilot stage, the valve 12 may be a commercial cartridge-type torque-motor device or of the kind described in my said copending patent application, the latter being preferred because of its inherently low mechanical hysteresis. Illustratively, the signal-valve member may be of approximately 0.040-in. diameter, being positioned by a torque motor whereby signal pressure ($P_s$) is determined by coil (11) current. Since the signal-pressure valve 12 has low regulation accuracy, signal pilot flow $Q_s$ is held to a relatively low but constant level (e.g., 0.10 gpm) by the pressure-compensated flow regulator 23, thereby allowing the torque-motor pilot to transduce coil current to signal pressure at constant flow, within the linearity and accuracy characteristics of the pilot. To achieve this magnitude of low but constant flow, the minimum flow-control pressure drop across orifice 34 (FIG. 2) is approximately 70 psi.

Thus far, in discussing FIG. 1 and its specific implementation, the emphasis has been on achieving a wide range of available set-point levels, with indication of the means (via differential-area selection at 54–55, in FIG. 3) to extend the high-pressure end of the range, as up to 5000 psi if desired. In any case, the flow regulator 23 is relied upon to maintain constant flow to the signal transducer 12 and to isolate signal pressure $P_s$ from system pressure $P_o$. However, since the control power to operate the hydraulic circuitry of FIG. 1 is supplied by the controlled system itself (line 13), there is a practical minimum controllable pressure $P_o$ (in the range of 100 to 150 psi), i.e., a minimum $P_o$ below which pilot functions cease to perform reliably.

Figure 7:
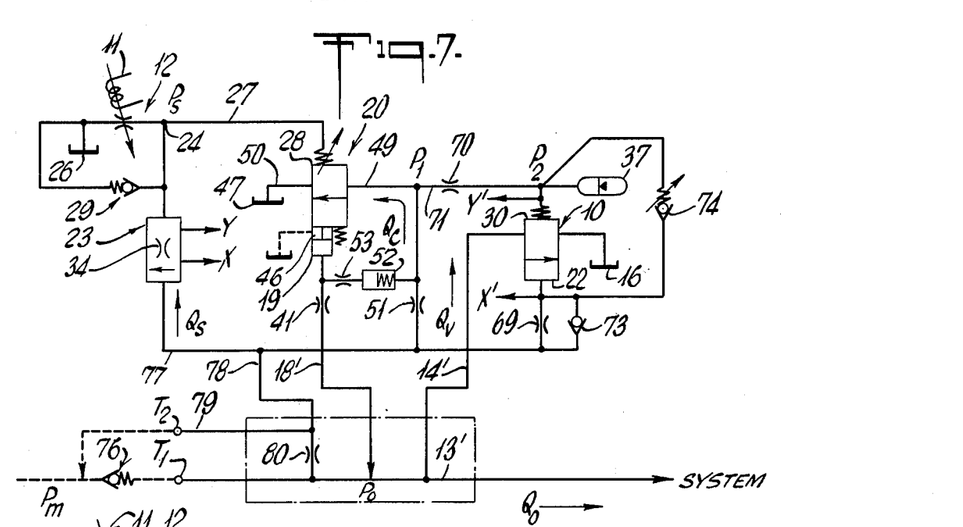
FIG. 7 is a view similar to FIG. 1, to show a modification having added capability for the circumstance of lower system-pressure operation.

To meet a need where lower system-pressure levels may be involved for a given range of set points, I show in FIG. 7 a modified hydraulic circuit incorporating an excitation-bridge feature for the supply of an adequately high pilot-control pressure, whatever the level of system pressure. Much of what is shown in FIG. 7 will be recognized from FIG. 1 and therefore the same reference numbers are used, as applicable.

The system line 13' of FIG. 7 is supplied by a hydraulic pump (not shown) having an output-pressure capability $P_m$ adequate to the already (FIG. 1) described range of operation, but a check valve 76 is introduced in the pump connection to line 13' to assure against a drop in pressure $P_m$ for lower levels of system pressure $P_o$; the check valve 76 may be of variety offering fixed-bias resistance, or it may be a so-called sequence valve, all to the end that a certain minimum pressure (e.g., 150 psi) shall be guaranteed to the control-function line 77 (via 78-79) before direct flow from the source (at $P_m$) will be passed to the system via valve 76. Importantly, the sensor chamber 19 of the preamplifier stage 20' continues to be connected for sensing system pressure $P_o$ via line 18'. But all other pressure-responsive connections are supplied from an auxiliary line 77 directly connected by means 78–79 to the source pressure $P_m$, upstream from valve 76; an orifice 80 connects lines 78 and 13' and is selected to assure such pressure drop as will assure adequate pressure in line 77 for control purposes, particularly when low system pressure $P_o$ dictates a high flow via orifice 80.

Specifically, for the parameters of the above-described illustrative components, orifice 80 may be set to provide a drop of approximately 150 psi at 1.0 gpm, while offering essentially negligible resistance to pilot-flow levels of 0.25 gpm. This being the case, for $P_o$ levels below 150 psi, the connection 79 assures control-operating pressures at 77 of at least 150 psi; and for $P_o$ levels above 150 psi, the circuitry operates essentially the same as without the bridge connection, i.e., as in FIG. 1.

While the FIG. 7 circuitry provides assurance of adequate pilot-control pressures through a self-regulating bridge utilization of the same source for both pilot-control and system-pressure purposes, it will be appreciated that separate sources may serve these separate purposes, as by separate-source connection to the points $T_1$ and $T_2$ in lines 13' and 79, respectively. Flow in the control-pressure line will always be at relatively low levels and can be passed to the system line via orifice 80, to the extent it is not needed for control-pressure purposes. One of the advantages of such a separate pilot-control source is that low-capacity micronic filtering can be incorporated in line 79 without requiring large full-flow filters in the main system line 13'. The fact that the control-function line can be maintained at a higher pressure than the system line (via bridge orifice 80) insures that only filtered oil will be presented to the signal stage from the pilot-control stage.

Figure 8:
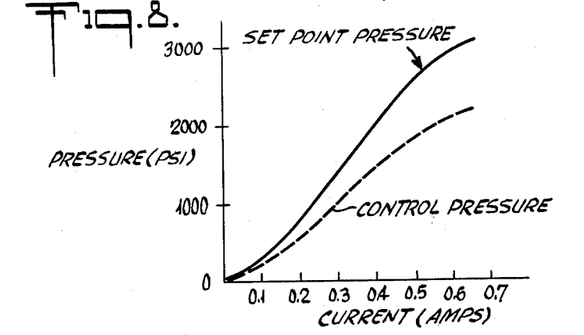
FIGS. 8 to 10 are graphs to illustrate further performance features of the invention.

Having identified illustrative parameters and relationships at each of the various stages of the relief circuitry of FIGS. 1 and 7, I shall now discuss overall operation, beginning with reference to FIG. 8, which displays the relation between set-point pressure (solid-line curve) and signal-pilot pressure (dashed-line curve), for the range of electrical current input at 11, and for an illustrative flow rate $Q_v$ of 4 gpm. The selected transducer is seen to have a useful range to 0.60 ampere (D-C) and a nominal adjustment sensitivity of about 500 psi/100 ma., over the range 25 to 3000 psi (assuming bridge connection per FIG. 7 for the lower pressures). The spread between the curves of FIG. 8 reflects the above-noted differential-area response to the preamplifier stage due to the different pressure-responsive areas presented at chambers 19–28. For simplicity, the curves of FIG. 8 illustrate only increasing electrical signal current; for the conventional Fema at 12, hysteresis effects will modify the profile for increasing vs. decreasing current, but for the essentially hysteresis-free torque motor of my said pending patent application, the curves of FIG. 8 are generally illustrative for both directions of current change.

Figure 9:
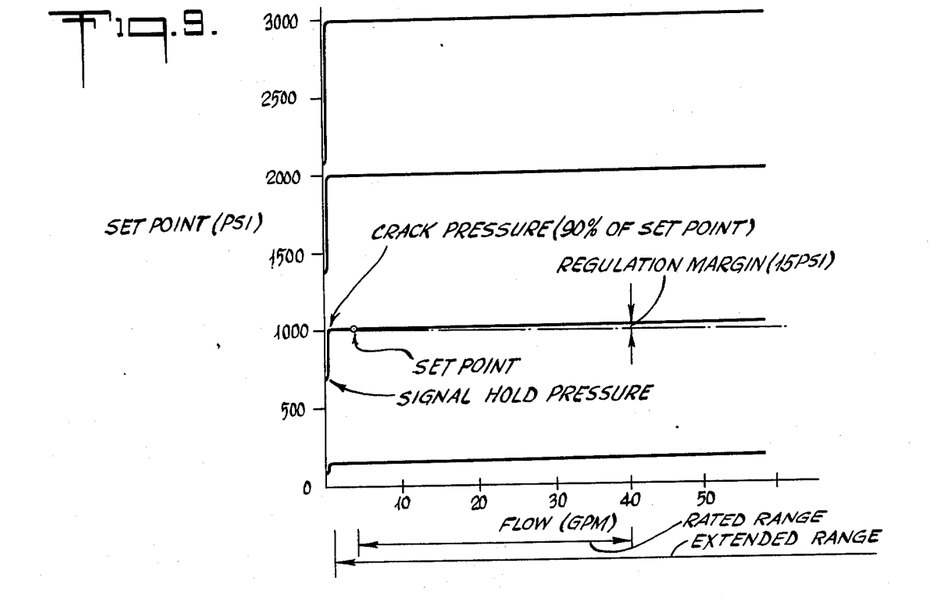

FIG. 9 displays a typical nominal steady-state regulation profile of the described relief-valve circuitry, over a set-point range from 150 psi to 3000 psi, at rated conditions. At the same time, FIG. 9 shows that for extended flow ranging to 60 gpm, the same regulation profile is valid down to 150-psi set-point adjustment. For set points below 150 psi, the excitation bridge of FIG. 7 is recommended, and with flows to a maximum of 40 gpm. For the case of a 1000-psi set-point, FIG. 9 identifies a nominal 15-psi regulation margin at 40 gpm, and a nominal crack pressure at 99 percent of the set-point pressure.

Figure 10:
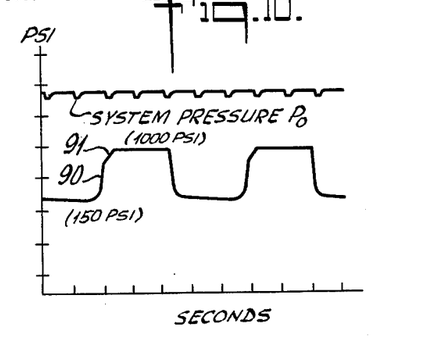

Finally, FIG. 10 is a test-response profile for the circuitry of my invention, showing a strip-chart recorder read-out for power-valve response to step changes in electrical-signal input at 11, the response being that of a pressure transducer connected to the system line 13 (13'). The step changes in electrical signal were effected by electrical-circuit switching. Analysis of the recorder chart reveals repeatable smooth stable pressure response. Moreover, the relatively rapid rise in system pressure (curve 90) to approximately 70 percent of the commanded set-point change will be recognized as the work of the X-Y flow switch at 23; beyond this point, the X-Y switch has closed, allowing a stable but slower final unerring approach (curve 91) to the set-point pressure. The ability of the X-Y signal-flow switch to limit pressure-rise overshoot is clearly evident, and decompression is prompt, smooth and without shock.

The described hydraulic circuitry will be seen to have achieved all stated objects, providing high accuracy, low overshoot and decompression control not previously available. It is believed that the use of a preamplifier stage, between signal-pressure and power-valve stages that are totally isolated from each other, is in large part responsible for this superior performance, and by using the essentially hysteresis-free torque-motor valve of my said copending application, an essentially hysteresis-free system is provided wherein response to set-point changes is closely repeatable and smoothly achieved whether the change involves increasing or decreasing system pressure, and regardless of the succession of changes which precede any given change.

Figure 11:
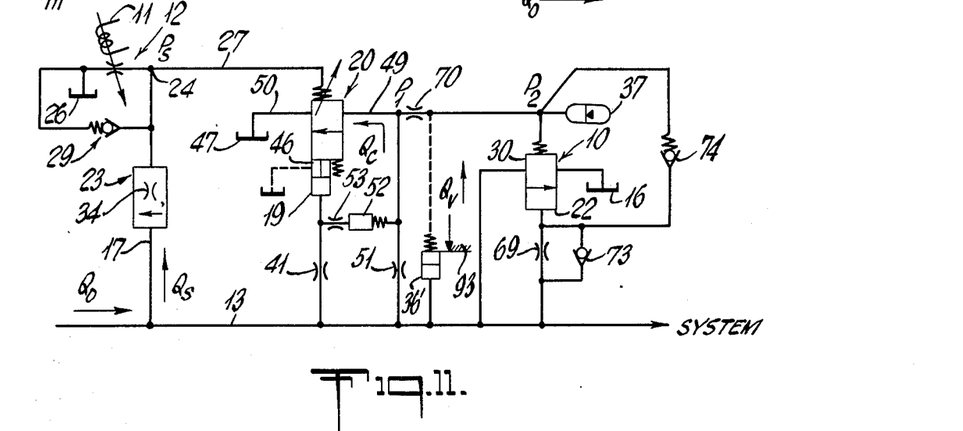
FIG. 11 is another view similar to FIG. 1, to show a further modification.

While the invention has been described in detail for the preferred forms shown, it will be understood that modification can be made without departing from the scope of the invention. For example, instead of the X-Y switch and instead of connecting the shunt capacitor 36 of FIG. 1 between the system-pressure line 13 and one of the X-Y switch connections, an analogous capacitor 36' is shown in FIG. 11 between line 13 and the power-stage side of orifice 70 in line 71. Capacitor 36' is a spring-biased piston between the system line and oil volume 37, wherein the spring-piston capacitance is approximately 100 times that which is effectively at the pilot-connected main-valve chamber 30, the latter capacitance being symbolized by oil volume 37. Capacitor (36') action is promptly to charge volume 37 for all frequencies up to that frequency which causes a differential pressure (across the power stage, i.e., between chambers 22 and 30) equal to its bias-spring preload, approximately 35 psi, at which time the main-stage valve begins to open at 67–68. The shunt capacitor 36' is effective until it saturates its movement against a piston stop 93, the latter being adjustably positionable, thereby providing for cut-out control at any selected frequency. In similar fashion, the shunt capacitor 36 of FIG. 1 determines when the shunt-capacitor action is cut out, during the initial phase 90 of pressure rise, i.e., while the X-Y switch is open.

What is claimed is:

1. In pressure-control apparatus for connection to and combination with a source of fluid pressure; power-valve means including an inlet port and an outlet port, a valve element having opposed control areas, a first fluid chamber communicating with one of said control areas and having means for connection to said source, a second fluid chamber communicating with the other of said control areas, said valve element being movable between open and closed positions responsive to a pressure-differential between said first and second chambers for delivering a control flow of fluid from the source and via said ports, means biasing said valve member in its valve-closing direction, and control means to modify the pressure difference between said chambers; said control means comprising a pilot valve having inlet and outlet ports, an inlet-port connection for said pilot valve for connecting the same to the source and including a first orifice for drawing a control flow of pressure fluid, said pilot valve including a pilot-valve element with at least one control area, a pilot-valve fluid chamber communicating with said pilot-valve control area, chamber-connection means for connecting said pilot-valve chamber to the source and including an orifice whereby the pilot-valve chamber senses source pressure via the orifice of said pilot-valve chamber-connection means, a control connection from said pilot-valve inlet port to the second chamber of said power-valve means, means for biasing said pilot-valve member with a force in opposition to pressure in said pilot-valve chamber, and means including a compliant barrier to static flow interconnecting said pilot-valve chamber and said pilot-valve inlet port.

2. Pressure-control apparatus according to claim 1, in which said pilot-valve inlet-port connection is the first of two connections for connecting said pilot-valve inlet port to the source, said second pilot-valve inlet-port connection including a check valve biased to open at a predetermined pressure differential across said first pilot-valve inlet-port connection, whereby operation of said power-valve means is limited to the range protected by the bias setting of said check valve.

3. In pressure-control apparatus for connection to and combination with a source of fluid pressure; power-valve means including an inlet port and an outlet port, a valve element having opposed control areas, a first fluid chamber communicating with one of said control areas and having means for connection to said source, a second fluid chamber communicating with the other of said control areas, said valve element being movable between open and closed positions responsive to a pressure-differential between said first and second chambers for delivering a control flow of fluid from the source and via said ports, means biasing said valve member in its valve-closing direction, and control means to modify the pressure difference between said chambers; said control means comprising a pilot valve having inlet and outlet ports, a first inlet-port connection for said pilot valve for connecting the same to the source and including a first orifice for drawing a control flow of pressure fluid, said pilot valve including a pilot-valve element with at least one control area, a pilot-valve fluid chamber communicating with said pilot-valve control area, chamber-connection means for connecting said pilot-valve chamber to the source whereby the pilot-valve chamber senses source pressure via the orifice of said pilot-valve chamber-connection means, a control connection from said pilot-valve inlet port to the second chamber of said power-valve means, means for biasing said pilot-valve member with a force in opposition to pressure in said pilot-valve chamber, and a second pilot-valve inlet-port connection including a biased check valve for connecting the pilot valve to the source in parallel with said first inlet-port connection, said check valve being biased to open at a predetermined pressure differential across said first pilot-valve inlet-port connection, whereby operation of said power-valve means is limited to the range protected by the bias setting of said check valve.

4. Pressure-control apparatus according to claim 3, in which the check-valve bias is set for check-valve opening at a predetermined level of said pressure differential which level is in excess of the normal full range of values of said pressure differential for control of said power-valve means.

5. Pressure-control apparatus according to claim 1, in which said pilot-valve element has a second control area and a second pilot-valve fluid chamber communicating with said second pilot-valve control area, a signal-pressure valve having an inlet port and means including a pressure-compensated flow-control valve for connecting said signal-pressure port to the source so that a constant-flow condition may be established for said signal-pressure valve, and a signal-pressure control connection from said signal-pressure port to said second pilot-valve fluid chamber.

6. Pressure-control apparatus according to claim 5, in which said pressure-compensated flow-control valve includes a movable flow-control member, and a pressure-fluid connection between the chambers of said power-valve means and via said flow-control valve, said last-mentioned connection being normally open and responsive to movement of said flow-control member such that said last-mentioned connection is effectively closed upon approach to achievement of said constant-flow condition.

7. Pressure-control apparatus according to claim 5, in which the first-mentioned and second control areas of said pilot-valve element are of different extent.

8. Pressure-control apparatus according to claim 7, in which said second pilot-valve control area is greater than said first-mentioned pilot-valve control area.

9. Pressure-control apparatus according to claim 7, in which said pilot valve includes two springs biased in opposition to each other and operative upon said pilot-valve element for null-balance control of said pilot-valve element.

10. Pressure-control apparatus according to claim 9, in which said springs are characterized by substantially the same spring rate.

11. Pressure-control apparatus according to claim 1, in which said pilot-valve element has a second control area and a second pilot-valve fluid chamber communicating with said second pilot-valve control area, and a signal-pressure hydraulic control connection to said second pilot-valve fluid chamber.

12. Pressure-control apparatus according to claim 1, in which said means for source-connection of said first fluid chamber of said power-valve means includes a restrictive orifice and a check valve connected across said restrictive orifice, the flow-conducting direction of said check valve being from the source of the first chamber of said power-valve means.

13. In a pressure-control apparatus for connection to and combination with a source of fluid pressure, a high-pressure control-function line for connection to the source, a reduced-pressure system line including pressure-reducing means for connection to the source, means including a restrictive orifice interconnecting said control-function line and said system line; a signal-pressure stage including a signal-pressure valve having an inlet port and flow-control valve means connecting said control-function line to said port so that a constant-flow condition may be established for said signal-pressure valve; a preamplifier stage comprising a pilot valve having inlet and outlet ports, a pilot-valve inlet-port connection including an orifice for connecting the same to said control-function line for drawing a control flow of pressure fluid, a pilot-valve element having opposed control areas and with first and second fluid chambers communicating with the respective control areas, a signal-pressure control connection from said signal-pressure port to one of said pilot-valve chambers, means connecting the other pilot-valve chamber to said system line, whereby said other pilot-valve chamber may sense system-line pressure; and a power stage comprising power-valve means having inlet and outlet ports, a power-valve element having opposed control areas and with first and second fluid chambers communicating with the respective control areas, means connecting one of said power-valve chambers to said control-function line, means connecting the other power-valve chamber to the inlet-port connection of said pilot valve, means connecting said system line to said power-valve inlet port, said power-valve element being movable between open and closed positions responsive to a pressure-differential between said power-valve chambers for delivering a control flow of fluid from said system line and via said power-valve ports, and means biasing said power-valve member in its valve-closing direction.

14. Pressure-control apparatus according to claim 13, in which said pilot-valve to power-valve connecting means includes an orifice.

15. In a pressure-control apparatus for connection to and combination with a principal source of fluid pressure and for selective further connection to and combination with a supplementary source of fluid pressure at relatively elevated pressure and relatively low flow, a control-function line for connection to the supplementary source, a system-supply line for connection to the principal source, means including a restrictive orifice interconnecting said control-function line and said system-supply line; a signal-pressure stage including a signal-pressure valve having an inlet port and flow-control valve means connecting said control-function line to said port so that a constant-flow condition may be established for said signal-pressure valve; a preamplifier stage comprising a pilot valve having inlet and outlet ports, a pilot-valve inlet-port connection including an orifice for connecting the same to said control-function line for drawing a control flow of pressure fluid, a pilot-valve element having opposed control areas and with first and second fluid chambers communicating with the respective control areas, a signal-pressure control connection from said signal-pressure port to one of said pilot-valve chambers, means connecting the other pilot-valve chamber to said system-supply line, whereby said other pilot-valve chamber may sense system-supply line pressure; and a power stage comprising power-valve means having inlet and outlet ports, a power-valve element having opposed control areas and with first and second fluid chambers communicating with the respective control areas, means connecting one of said power-valve chambers to said control-function line, means connecting the other power-valve chamber to the inlet-port connection of said pilot valve, means connecting said system-supply line to said power-valve inlet port, said power-valve element being movable between open and closed positions responsive to a pressure-differential between said power-valve chambers for delivering a control flow of fluid from said system-supply line and via said power-valve ports, and means biasing said power-valve member in its valve-closing direction.

16. Pressure-control apparatus according to claim 15, in which said pilot-valve to power-valve connecting means includes an orifice.

17. Electro-proportional relief-valve apparatus for connection to and combination with a system-supply line having means for connection to a source of fluid pressure; a signal-pressure stage including an electrically operated signal-pressure valve having an inlet port and flow-control valve means connecting said system-supply line to said port so that a constant-flow condition may be established for said signal-pressure valve; a preamplifier stage comprising a pilot valve having inlet and outlet ports, a pilot-valve inlet-port connection including an orifice for connecting the same to said system-supply line for drawing a control flow of pressure fluid, a pilot-valve element having opposed control areas and with first and second fluid chambers communicating with the respective control areas, a signal-pressure control connection from said signal-pressure port to one of said pilot-valve chambers, means connecting the other pilot-valve chamber to said system-supply line, whereby said other pilot-valve chamber may sense system-supply line pressure; and a power stage comprising power-valve means having inlet and outlet ports, a power-valve element having opposed control areas and with first and second fluid chambers communicating with the respective control areas, means connecting one of said power-valve chambers to said system-supply line, means connecting the other power-valve chamber to the inlet-port connection of said pilot valve, means connecting said system-supply line to said power-valve inlet port, said power-valve element being movable between open and closed positions responsive to a pressure-differential between said power-valve chambers for delivering a control flow of fluid from said system-supply line and via said power-valve ports, and means biasing said power-valve member in its valve-closing direction.

18. Electro-proportional relief-valve apparatus according to claim 17, in which said last-defined means includes a compliant barrier to static flow effectively interconnecting said source and said other power-valve chamber.

19. Electro-proportional relief-valve apparatus according to claim 18, in which said flow-control valve means includes a movable flow-control member and associated porting, and in which said compliant-barrier connection of said source to said other power-valve chamber is via said flow-control porting, said flow-control member and associated porting being normally open and responsive to movement of said flow-control member such that said last-mentioned connection is effectively closed upon approach to achievement of said constant-flow condition.

20. In pressure-control apparatus for connection to and combination with a source of fluid pressure; power-valve means including an inlet port and an outlet port, a valve element having opposed control areas, a first fluid chamber communicating with one of said control areas and having means for connection to said source, a second fluid chamber communicating with the other of said control areas, said valve element being movable between open and closed positions responsive to a pressure-differential between said first and second chambers for delivering a control flow of fluid from the source and via said ports, means biasing said valve member in its valve-closing direction, and control means to modify the pressure difference between said chambers; said control means comprising a pilot valve having inlet and outlet ports, an inlet-port connection for said pilot valve for connecting the same to the source and including a first orifice for drawing a control flow of pressure fluid, said pilot valve including a pilot-valve element with at least one control area, a pilot-valve fluid chamber communicating with said pilot-valve control area, chamber-connection means for connecting said pilot-valve chamber to the source and including an orifice whereby the pilot-valve chamber senses source pressure via the orifice of said pilot-valve chamber-connection means, a control connection from said pilot-valve inlet port to the second chamber of said power-valve means, said control connection including a restrictive orifice, means for biasing said pilot-valve member with a force in opposition to pressure in said pilot-valve chamber, and means including a compliant barrier to static flow effectively interconnecting said source and the second fluid chamber of said power-valve means on the power-valve side of the restrictive orifice of said control connection.

21. The pressure-control apparatus of claim 20, in which said compliant barrier to static flow is a spring-loaded capacitance.

22. In pressure-control apparatus for connection to and combination with a source of fluid pressure; power-valve means including an inlet port and an outlet port, a valve element having opposed control areas, a first fluid chamber communicating with one of said control areas and having means for connection to said source, a second fluid chamber communicating with the other of said control areas, said valve element being movable between open and closed positions responsive to a pressure-differential between said first and second chambers for delivering a control flow of fluid from the source and via said ports, means biasing said valve member in its valve-closing direction, and control means to modify the pressure difference between said chambers; said control means comprising a pilot valve having inlet and outlet ports, an inlet-port connection for said pilot valve for connecting the same to the source and including a first orifice for drawing a control flow of pressure fluid, said pilot valve including a pilot-valve element with two opposed control areas, a first pilot-valve fluid chamber communicating with one of said pilot-valve control areas, chamber-connection means for connecting said first pilot-valve chamber to the source and including an orifice whereby the pilot-valve chamber senses source pressure via the orifice of said pilot-valve chamber-connection means, a control connection from said pilot-valve inlet port to the second chamber of said power-valve means, said control connection including a restrictive orifice, and means for loading said pilot-valve member with a force in opposition to pressure in said pilot-valve chamber, said last-mentioned means including a second pilot-valve fluid chamber communicating with the other of said pilot-valve control areas; a signal-pressure valve having an inlet port and means including a pressure-compensated flow-control valve for connecting said signal-pressure port to the source so that a constant-flow condition may be established for said signal-pressure valve, and a signal-pressure control connection from said signal-pressure port to said second pilot-valve fluid chamber, said flow-control valve including a movable flow-control member and associated porting; and means including a compliant barrier to static flow effectively inter-connecting said source via said flow-control porting and to the second fluid chamber of said power-valve means, said last-mentioned connection being normally open and responsive to movement of said flow-control member such that said last-mentioned connection is effectively closed upon approach to achievement of said constant-flow condition.

23. The pressure-control apparatus of claim 22, in which said compliant barrier to static flow is a spring-loaded capacitance.

* * * * *